March 6, 1945.  B. G. CARLSON  2,370,840
BLIND RIVET HAND TOOL
Filed Oct. 8, 1943
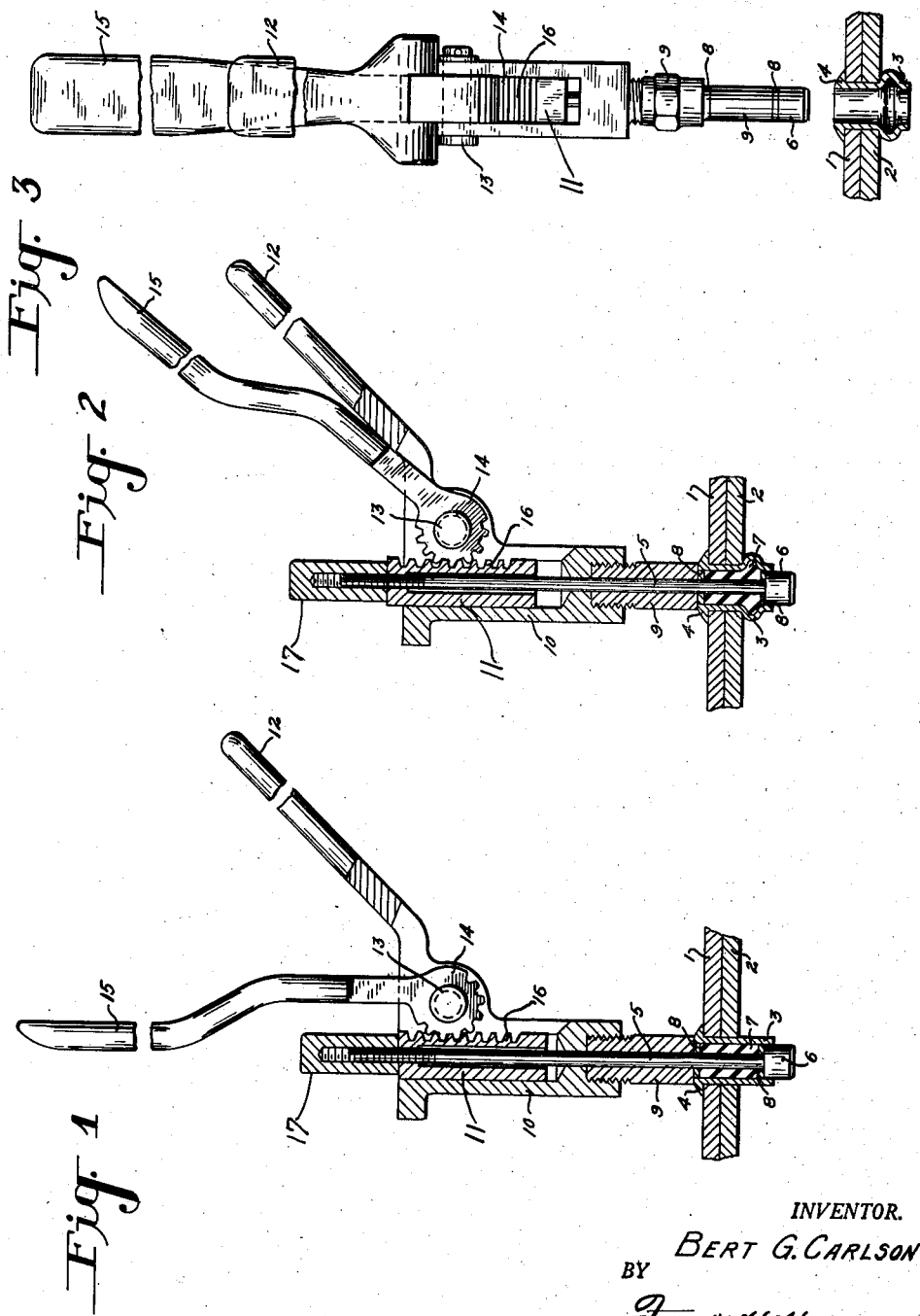
INVENTOR.
BERT G. CARLSON
BY
ATTORNEY Patented Mar. 6, 1945

2,370,840

UNITED STATES PATENT OFFICE 2,370,840

BLIND RIVET HAND TOOL

Bert G. Carlson, Erieside, Ohio, assignor, by mesne assignments, to Jack & Heintz, Inc., Cleveland Ohio, a corporation of Ohio Application October 8, 1943, Serial No. 505,509

2 Claims. (Cl. 218—19)

This invention relates to improvements in means for expanding rivets and has for its primary object to provide a manually operable blind rivet set, by the use of which the rivet may be inserted in an appropriate hole in the pieces to be riveted together, the rivet expanding tool inserted in the rivet and after simple expanding operation be removed from the rivet for subsequent expanding operations on other rivets.

With this in mind, it is proposed to provide a rivet expanding tool to include a spindle with an enlarged head at one end to retain a removable rubber sleeve with metal washers on either end, and a convenient rack and hand lever actuated pinion for moving the spindle longitudinally so as to force the rubber sleeve to uniformly expand the rivet. In this manner the operation of the hand lever in the opposite direction will allow the removal of the tool from the rivet.

With the foregoing and other objects in view, the invention resides in the combination of parts and in the details of construction hereinafter set forth in the following specification and appended claims, certain embodiments thereof being illustrated in the accompanying drawing, in which:

Figure 1 is a view in vertical section taken through the tool, rivet and two adjoining pieces to be riveted together, and showing the tool inserted in the rivet prior to expansion of the latter;

Figure 2 is a view of the tool partly in elevation and partly in vertical section, showing the sleeve distorted and the rivet flared; and Figure 3 is a view in vertical section of the flared rivet and showing the tool partly in elevation and partly in vertical section and the tool, its spindle and sleeve removed from the flared rivet.

Referring more particularly to the drawing, the two pieces to be riveted together are shown at 1 and 2. The invention having more primarily to do with blind riveting, it may be assumed that the underneath side of piece 2 is inaccessible. By means of the tool to be described the rivet 3, to be flared, may be inserted into a hole extending through pieces 1 and 2 until its flange 4 rests on piece 1.

The tool includes a spindle 5 with an enlarged head 6 to retain a removable rubber sleeve 7. In order to prevent undue wear, the rubber sleeve preferably has vulcanized to each end a metal washer 8. Spindle 5 is slidable within a barrel 9 screwed to a body portion 10 in which a bushing 11 is slidably mounted and to which latter the spindle is screw threadedly attached. Integral with the body portion 10 is a handle 12 to which is rotatably secured at 13 a pinion 14 with its operating lever 15. This pinion meshes with a rack 16 which is integral with bushing 11. A separate cap piece 17 is also screw threaded to the top of the spindle to move with bushing 11.

In operation, and as viewed in Figure 1, the rubber sleeve 7 is confined between the enlarged head 6 and the lower end of barrel 9 around the spindle 5 as well as the rivet 3 through which it protrudes.

A downward pressure on lever 15, which may be conveniently applied by squeezing lever 15 and handle 12 with one hand, rotates pinion 14 clockwise which actuates rack 16 upwardly and consequently draws the spindle upwardly. The result of such movement is to distort the rubber sleeve by placing it under compression in the smaller vertical space between head 6 and barrel 9. The rubber sleeve, having no avenue of escape, exerts an outward force on the rivet and bows the main portion thereof, as shown in Figure 2, which represents the position of the assembly when the rivet has been fully expanded and pieces 1 and 2 completely riveted together.

This having been accomplished, the tool may be removed by first rotating lever 15 counter-clockwise which through the rack and pinion forces the spindle downwardly and thus relieves the vertical clamping pressure of barrel 9 and head 6 on the rubber sleeve 7 until it resumes its original normal shape, as shown in Figures 1 and 3 while the rivet remains flared as shown in Figures 2 and 3. The tool, having been removed, as shown in Figure 3, is then in readiness for subsequent operation on other rivets. The purpose of the screw threaded adjustability of barrel 9 in the body portion 10 is to adjust the normal distance between the barrel and head 6 in order to predetermine the expansion of the rivet and the dimensions of the rubber sleeve for proper rivet flaring operations.

By reason of the simple, effective, quick-acting and readily removable tool, each rivet may be quickly flared, the tool removed and the operation repeated on other rivets regardless of the blind and inaccessible nature of rivet location.

I claim:

1. A tool for compressing and flaring a blind hollow rivet having one preformed flared end and its other end straight and unflared to hold two pieces of material together comprising a spindle with an enlarged head insertable through the rivet, a rubber sleeve slidable on said spindle and of a normal diameter substantially equal to that of said head to be retained thereby against movement in one direction on said spindle, a two-part longitudinally adjustable body portion to slidably receive said spindle and abut the preformed flared end of the rivet, a rack slidably mounted in said body portion and screw-threadedly connected to said spindle, a pinion rotatably mounted on said body portion to mesh with said rack and having a manually operable lever for rotating the pinion in either direction for drawing said spindle head upwardly to predeterminedly deform said sleeve and thus expand and flare the under, or blind, portion of said rivet to force said two pieces of material together and retain the same in such relationship.

2. A tool for compressing and flaring a blind hollow rivet having one preformed flared end and its other end straight and unflared to hold two pieces of material together comprising a spindle with an enlarged head insertable through the rivet, a rubber sleeve slidable on said spindle and of a normal diameter substantially equal to that of said head to be retained thereby against movement in one direction on said spindle, a two-part longitudinally adjustable body portion to slidably receive said spindle and abut the preformed flared end of the rivet, a rack slidably mounted in said body portion and screw-threadedly connected to said spindle, a pinion rotatably mounted on said body portion to mesh with said rack and having a manually operable lever for rotating the pinion in one direction for drawing said spindle head upwardly to predeterminedly deform said sleeve and thus expand and flare the under, or blind, portion of said rivet to force said two pieces of material together and retain the same in such relationship, said lever upon a manual turning in the opposite direction being adapted to release the pressure of said spindle head on said rubber sleeve permitting the latter to resume its normal diameter so that the rubber sleeve and the spindle head may be removed from the flared rivet.

BERT G. CARLSON.